United States Patent
Cain (10) Patent No.: US 11,467,775 B2
(45) Date of Patent: Oct. 11, 2022

(54) VIRTUAL PERSISTENT VOLUMES FOR CONTAINERIZED APPLICATIONS

(71) Applicant: HEWLETT PACKARD ENTERPRISE DEVELOPMENT LP, Houston, TX (US)

(72) Inventor: Bradley Cain, Groton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/653,375

(22) Filed: Oct. 15, 2019

(65) Prior Publication Data
US 2021/0109683 A1 Apr. 15, 2021

(51) Int. Cl.
*G06F 3/06* (2006.01)
*G06F 11/14* (2006.01)

(52) U.S. Cl.
CPC ........... *G06F 3/0664* (2013.01); *G06F 3/067* (2013.01); *G06F 3/0614* (2013.01); *G06F 3/0641* (2013.01); *G06F 3/0647* (2013.01); *G06F 3/0659* (2013.01); *G06F 3/0683* (2013.01); *G06F 11/1458* (2013.01); *G06F 2201/84* (2013.01)

(58) Field of Classification Search
CPC ...... G06F 3/067; G06F 3/0659; G06F 3/0641; G06F 3/0647; G06F 3/0664; G06F 3/0683; G06F 3/0614; G06F 11/1458; G06F 2201/84; G06F 3/0665; G06F 11/1464; G06F 3/061; G06F 11/1461; G06F 11/1484; G06F 11/1466

USPC ........................................................ 711/154
See application file for complete search history.

(56) References Cited

U.S. PATENT DOCUMENTS

| | | | |
|---|---|---|---|
| 7,587,570 B2 | 9/2009 | Sarkar et al. | |
| 7,930,476 B1 | 4/2011 | Castelli et al. | |
| 8,386,610 B2 | 2/2013 | Yahalom et al. | |
| 8,478,799 B2 | 7/2013 | Beaverson et al. | |
| 8,621,461 B1 | 12/2013 | Chandrachari et al. | |
| 9,015,713 B2 | 4/2015 | Baset et al. | |
| 9,021,476 B1 | 4/2015 | Pratt | |
| 9,135,046 B1 | 9/2015 | Pratt | |
| 9,372,758 B2 | 6/2016 | Ashutosh et al. | |
| 9,418,015 B2 | 8/2016 | Sundaram et al. | |
| 9,432,350 B2 | 8/2016 | Anderson et al. | |

(Continued)

OTHER PUBLICATIONS

DataCore Software, "Container Persistent Storage", available online at <https://www.datacore.com/products/software-defined-storage/container-storage/>, 2019, 9 pages.

(Continued)

*Primary Examiner* — Hashem Farrokh
(74) *Attorney, Agent, or Firm* — Trop, Pruner & Hu, P.C.

(57) ABSTRACT

Example implementations relate to virtual persistent volumes for containerized applications. In an example, a plurality of different storage mounts are acquired from a mix of storage types. A containerized storage virtualization system creates and manages a virtual persistent volume that aggregates the acquired storage mounts. A mount point of the virtual persistent volume is provided to the containerized application. The virtual persistent volume includes a hierarchical structure that relates data objects of the containerized application by content-based signatures to a root object.

21 Claims, 3 Drawing Sheets

(56) References Cited

U.S. PATENT DOCUMENTS

| | | | |
|---|---|---|---|
| 9,436,391 | B1 | 9/2016 | Lewis et al. |
| 9,590,879 | B2 | 3/2017 | Wray |
| 9,667,725 | B1 | 5/2017 | Khanduja et al. |
| 9,705,730 | B1 | 7/2017 | Petri et al. |
| 9,798,474 | B2 | 10/2017 | Barzik et al. |
| 9,800,575 | B1 | 10/2017 | Lewis et al. |
| 10,013,196 | B2 | 7/2018 | Tylik et al. |
| 10,055,420 | B1 | 8/2018 | Pogde et al. |
| 10,127,234 | B1 * | 11/2018 | Krishnan ............... G06N 20/00 |
| 10,140,139 | B1 | 11/2018 | Pratt |
| 10,146,580 | B2 | 12/2018 | Chen |
| 10,216,455 | B1 | 2/2019 | Schroeder et al. |
| 10,223,024 | B2 | 3/2019 | Sharma |
| 10,241,709 | B2 | 3/2019 | Scales et al. |
| 10,326,744 | B1 | 6/2019 | Nossik et al. |
| 10,397,236 | B1 | 8/2019 | Chadha et al. |
| 10,432,483 | B1 | 10/2019 | Thompson |
| 10,452,298 | B2 | 10/2019 | Kurjanowicz et al. |
| 10,500,441 | B2 | 12/2019 | Lagree |
| 2004/0120225 | A1 | 6/2004 | Dalal et al. |
| 2004/0123029 | A1 | 6/2004 | Dalal et al. |
| 2004/0123030 | A1 | 6/2004 | Dalal et al. |
| 2004/0123062 | A1 | 6/2004 | Dalal et al. |
| 2004/0123063 | A1 | 6/2004 | Dalal et al. |
| 2005/0060722 | A1 * | 3/2005 | Rochette ............... G06F 8/60 719/319 |
| 2005/0283567 | A1 | 12/2005 | Popescu-Stanesti et al. |
| 2007/0283119 | A1 | 12/2007 | Sarkar et al. |
| 2009/0172666 | A1 | 7/2009 | Yahalom et al. |
| 2009/0182928 | A1 | 7/2009 | Becker et al. |
| 2009/0183173 | A1 | 7/2009 | Becker et al. |
| 2010/0077160 | A1 | 3/2010 | Liu et al. |
| 2011/0124409 | A1 | 5/2011 | Baynes et al. |
| 2012/0017046 | A1 | 1/2012 | Mehta et al. |
| 2012/0089980 | A1 | 4/2012 | Sharp et al. |
| 2012/0117029 | A1 | 5/2012 | Gold |
| 2013/0042083 | A1 * | 2/2013 | Mutalik ............... G06F 16/185 711/162 |
| 2013/0054932 | A1 | 2/2013 | Acharya et al. |
| 2013/0297871 | A1 | 11/2013 | Reddy |
| 2014/0156877 | A1 | 6/2014 | Tylik |
| 2014/0173675 | A1 | 6/2014 | Ahmed et al. |
| 2015/0217164 | A1 | 8/2015 | Lagree |
| 2016/0070652 | A1 | 3/2016 | Sundararaman et al. |
| 2016/0188421 | A1 | 6/2016 | Karinta et al. |
| 2016/0196217 | A1 | 7/2016 | Chiu et al. |
| 2016/0291892 | A1 | 10/2016 | Rao et al. |
| 2016/0357450 | A1 | 12/2016 | Rao et al. |
| 2017/0013046 | A1 | 1/2017 | Flynn |
| 2017/0083250 | A1 | 3/2017 | Beeken et al. |
| 2017/0087470 | A1 | 3/2017 | Bostick et al. |
| 2017/0116273 | A1 | 4/2017 | Liu et al. |
| 2017/0139782 | A1 | 5/2017 | Chen |
| 2017/0177224 | A1 | 6/2017 | Glover et al. |
| 2017/0279797 | A1 * | 9/2017 | Cross, Jr. ............ G06F 9/45558 |
| 2017/0315795 | A1 | 11/2017 | Keller |
| 2018/0083845 | A1 | 3/2018 | Chan et al. |
| 2018/0181756 | A1 * | 6/2018 | Campagna ............... G06F 21/64 |
| 2018/0276689 | A1 | 9/2018 | Zhang et al. |
| 2018/0300325 | A1 * | 10/2018 | Chircop ............... G06F 3/0656 |
| 2019/0050257 | A1 | 2/2019 | Srinivasan |
| 2019/0065323 | A1 | 2/2019 | Dhamdhere et al. |
| 2019/0102265 | A1 | 4/2019 | Ngo et al. |
| 2019/0158541 | A1 | 5/2019 | Miriyala et al. |
| 2019/0212998 | A1 | 7/2019 | Vallala et al. |
| 2019/0235761 | A1 | 8/2019 | Watkins et al. |
| 2019/0266100 | A1 | 8/2019 | Mello et al. |
| 2020/0042214 | A1 * | 2/2020 | Chen .................. G06F 3/0604 |
| 2020/0241909 | A1 | 7/2020 | Govindaraju et al. |
| 2020/0241999 | A1 | 7/2020 | Guim et al. |
| 2020/0310849 | A1 | 10/2020 | Laurence et al. |
| 2020/0311299 | A1 | 10/2020 | Amar |
| 2020/0322453 | A1 | 10/2020 | Said et al. |
| 2020/0379880 | A1 * | 12/2020 | Rodrigues Rosa Junior ............... G06F 11/3616 |
| 2021/0008413 | A1 | 1/2021 | Asikainen et al. |
| 2021/0109772 | A1 | 4/2021 | Jaloma et al. |
| 2021/0124614 | A1 | 4/2021 | Gupta et al. |
| 2021/0133338 | A1 | 5/2021 | Chopra et al. |
| 2021/0173815 | A1 | 6/2021 | Kazi et al. |
| 2021/0397356 | A1 | 12/2021 | Cain |

OTHER PUBLICATIONS

Edward L. Haletky, "Virtual storage appliance market: Categories, capabilities", available online at <https://searchstorage.techtarget.com/tip/Virtual-storage-appliance-market-Categories-capabilities>, Retrieved on Jun. 27, 2019, 3 pages.

Janakiram MSV, "Managing Persistence For Docker Containers", available online at <https://thenewstack.io/methods-dealing-container-storage/>, Sep. 23, 2016, 20 pages.

Kirill Goltsman, "Software-Defined Storage Solutions for Kubernetes", available online at <https://supergiant.io/blog/software-defined-storage-solutions-for-kubernetes/>, Feb. 8, 2019, 10 pages.

Kubernetes, "Local Persistent Volumes for Kubernetes Goes Beta", available online at <https://kubernetes.io/blog/2018/04/13/local-persistent-volumes-beta/>, Apr. 13, 2018.

Netapp, "Using NetApp with Docker and Kubernetes", SL10236 Version 1.0.2, May 2018, pp. 1-58.

Piotr Mrowczynski, "Scaling cloud-native Apache Spark on Kubernetes for workloads in external storages", Sep. 21, 2018, 63 pages.

Red Hat OpenShift, "Persistent Storage", available online at <https://docs.openshift.com/online/architecture/additional_concepts/storage.html>, Retrieved online on Jun. 28, 2019, 9 pages.

Anoop Vijayan Maniankara, "Understanding the Container Storage Interface (CSI)", available online at <https://medium.com/google-cloud/understanding-the-container-storage-interface-csi-ddbeb966a3b>, Aug. 13, 2018, pp. 1-8.

Dejan Živanovic, "EMC: The Virtual Data Center", 2008, pp. 1-24.

DELL EMC, "DELL EMC ISILON ONEFS: A Technical Overview", Nov. 2017, pp. 1-37.

Dell Inc., "Dell MD Storage Array VMware vStorage APIs For Storage Awareness (VASA) Provider (Client): User's Guide", 2015, pp. 1-21.

EMC Corporation, "EMC Announces EMC Invista Network Storage Virtualization Platform", available online at <https://corporate.delltechnologies.com/en-us/newsroom/announcements/2005/05/20050516-3130.htm>, May 16, 2005, 5 pages.

EMC Corporation, "EMC® Rainfinity® File Management Appliance/VE Version 7.3: Getting Started Guide", Dec. 2009, pp. 1-78.

EMC Corporation, "EMC® Rainfinity® Global File Virtualization™ Application Version 7.2: Installation and User Guide", Jan. 2008, pp. 1-232.

EMC Corporation, "EMC® Rainfinity® Global Namespace Appliance Version 1.2.1: Getting Started Guide", Dec. 2008, pp. 1-132.

EMC Invista on Brocade, "Network-Based Storage Virtualization with EMC Invista and the Brocade Application Platform", Sep. 2007, 3 pages.

EMC2, "A Guide to Virtualizing Your Information Infrastructure", Oct. 2007, 12 pages.

EMC2, "EMC Rainfinity Global File Virtualization: Transparent Data Mobility for Heterogeneous File Storage", Oct. 2008, 2 pages.

F5 Networks, Inc., "Intelligent File Virtualization with F5 ARX", F5 White Paper, 2009, 11 pages.

F5 Networks, Inc., "Simplify Data Management and Reduce Storage Costs with File Virtualization", ARX Series, 2013, pp. 1-9.

Incipient, Inc., "Incipient NSP Addresses SAN Management Challenges by Reducing Complexity", 2006, 3 pages.

Kubernetes, "Introducing Container Storage Interface (CSI) Alpha for Kubernetes", available online at <https://kubernetes.io/blog/2018/01/introducing-container-storage-interface/>, Jan. 10, 2018, pp. 1-10.

Pirus Networks, "Pirus Networks offers new utility switch", available online at <https://www.computerweekly.com/news/2240044579/Pirus-Networks-offers-new-utility-switch>, Mar. 11, 2002, pp. 1-3.

(56) References Cited

OTHER PUBLICATIONS

Pirus Networks, "Pirus Product Overview", available online on <http://web.archive.org/web/20011031022514/http://www.pirus.com/products.html>, Oct. 31, 2001, pp. 1-2.
Sun Microsystems, "Storage White Paper: Intelligent Storage Platform", available online at <http://web.archive.org/web/20030201194118/http://www.sun.com/storage/white-papers/intelligent_storage_platform.html>, Feb. 1, 2003, pp. 1-5.
VMware, Inc., "APIs for Storage Awareness (VASA) Package", available online at <https://code.vmware.com/web/dp/other-programs/storage/vasa>, retrieved in 2020, 4 pages.
VMware, Inc., "vSphere Storage", Jun. 27, 2019, pp. 1-319.
Wikipedia, "OneFS distributed file system", Aug. 29, 2019, pp. 1-5.
Ali et al., "Performance Analysis Framework to Optimize Storage Infrastructure for Cloud Computing," Aug. 30, 2012, 6 pages.
Aluciani, "Nutanix Releases New Kubernetes CSI-Based Driver," available online at <https://next.nutanix.com/blog-40/nutanix-releases-new-kubernetes-csi-based-driver-30941>, Nutanix, Inc., Sep. 26, 2018, 7 pages.
Hitachi Vantara Knowledge, "Storage Plug-in for Containers Quick Reference Guide v2.0.1", available online at <https://knowledge.hitachivantara.com/Documents/Adapters_and_Drivers/Storage_Adapters_and_Drivers/Containers/2.0.1/01_Storage_Plug-in_for_Containers_Quick_Reference_Guide_v1.0.0>, Mar. 20, 2019, 45 pages.
Jay Vyas, "Kubernetes Storage: Dynamic Volumes and the Container Storage Interface",TheNewStack, available online at <https://thenewstack.io/kubernetes-storage-dynamic-volumes-and-the-container-storage-interface/>, May 7, 2019, 17 pages.
Michael Yakobi, "Understanding Kubernetes Persistent Volume Provisioning", NetApp, available online at <https://cloud.netapp.com/blog/understanding-kubernetes-persistent-volume-provisioning>, Nov. 20, 2018, 3 pages.
Tech Target, "Application-aware Storage Promises Intelligence and Automation," available online at <https://web.archive.org/web/20160817083831/https://searchstorage.techtarget.com/feature/Application-aware-storage-promises-intelligence-and-automation>, Aug. 17, 2016, 5 pages.
Tushar Thole, "Part 1: Storage Policy Based Management for Containers Orchestrated by Kubernetes", vmware, available online at <https://blogs.vmware.com/virtualblocks/2017/04/17/storage-policy-based-management-containers-orchestrated-kubernetes/>, Apr. 17, 2017, 4 pages.
HPE, "GUI Administration Guide", Version 5.1.x, Nov. 2, 2020, 306 pages.
Kubernetes, "Horizontal Pod Autoscaler", available online at <https://web.archive.org/web/20191217234051/https://kubernetes.io/docs/tasks/run-application/horizontal-pod-autoscale/>, Dec. 17, 2019, 9 pages.
Martinsen, Rudi, "Limiting disk i/o in vSphere", available online at <https://rudimartinsen.com/2018/06/18/limiting-disk-i-o-in-vsphere/>, Jun. 18, 2018, 7 pages.
Red Hat, Inc. "Dynamic Provisioning and Creating Storage Classes", Jul. 16, 2019, 12 pages, retrieved from internet: https://web.archive.org/web/20190716081123/https://docs.openshift.com/containerplatform/3.4/install_config/persistent_storage/dynamically_provisioning_pvs.html.
VMware, "vSphere Resource Management", Update 1, 2017, 146 pages.
The Linux Information Project, "The /mnt Directory," Feb. 13, 2006, <http://www.linfo.org/mnt.html>, 1 page.
Red Hat, What is container orchestrations?, Dec. 2, 2019 [retrieved from internet Jan. 17, 2022][<URL:https://www.redhat.com/en/topics/containers/what-is-container-orchestration>], 9 pages.

* cited by examiner

VIRTUAL PERSISTENT VOLUMES FOR CONTAINERIZED APPLICATIONS

BACKGROUND

Containers are a type of virtualization. A container may include an application packaged together with dependencies and libraries. A containerized application may use or generate persistent data.

BRIEF DESCRIPTION OF THE DRAWINGS

Various examples will be described below with reference to the following figures.

DETAILED DESCRIPTION

Container technology is a computing virtualization paradigm where an application is packaged together with dependencies and libraries in a container to provide an isolated environment for running the application. Such an application may be referred to as a containerized application. Many containers can run on top of a single operating system, but each container is inherently isolated from other containers. In this manner, the container paradigm may be understood to virtualize the operating system. Containers may be more lightweight than other forms of virtualization such as virtual machines, which virtualize hardware. For example, each virtual machine may have its own copy of an operating system kernel, while by contrast, multiple containers may share an operating system kernel.

Containerized applications may need storage to retain persistent data. Container orchestrators may provide the capability of provisioning some storage for a container. However, many types of storage exist, including but not limited to storage that is local to the container, remote to the container, hardware (e.g., locally attached drive), software-defined (e.g., a file system, virtualized or containerized storage, storage presented via an API, etc.), or storage having a combination of the foregoing aspects. Prior efforts at provisioning container storage may fail to provide the levels of storage configuration flexibility and data services that users and administrators of container environments desire. For example, a container orchestrator may be limited to provisioning one type of storage for an application. Other types of systems may attempt to concatenate multiple volumes together into a single volume, but such concatenation may not have the flexibility to provide certain data services without disrupting user access to the data.

By contrast, having the capability to provision any mix of any type of storage in a virtual persistent volume in a container environment and managing that virtual persistent volume in a highly virtualized manner may enable configuration flexibility and robust, consistent data services that unlock efficiencies and benefits for a container user (including administrators). The virtual persistent volume may decouple underlying mix of storage from how the data is abstracted and presented to a consumer of the data, such as a containerized application. As a result, data services, such as tiering, migration, snapshot-based back up, data protection, etc., may be performed on the virtual persistent volume in a manner that is transparent and non-disruptive to a containerized application using the virtual persistent volume and may also be performed in a consistent and predictable manner regardless of the underlying mix of storage making up the virtual persistent volume.

To provide the foregoing technical advantages, examples described herein may relate to a containerized storage virtualization system that receives a request for storage from a containerized application, acquires a plurality of different storage mounts from local and remote storage types in accordance with the request, creates a virtual persistent volume that aggregates the plurality of different storage mounts (and thus aggregates the corresponding local and remote storage allocations), and provides a mount point of the virtual persistent volume to the containerized application. The virtual persistent volume may take the form of a hierarchical structure, such as a Merkle tree, that relates data objects of the containerized application by their content-based signatures up to a root object. The root object may represent the entire virtual persistent volume. Also, the mount point of the virtual persistent volume may be one of any type of storage access abstraction understood by the containerized storage virtualization system, such as file, block, or key/value store. Thus, by virtue of the foregoing, a virtual persistent volume may be created that decouples underlying storage from the containerized application.

Figure 1:
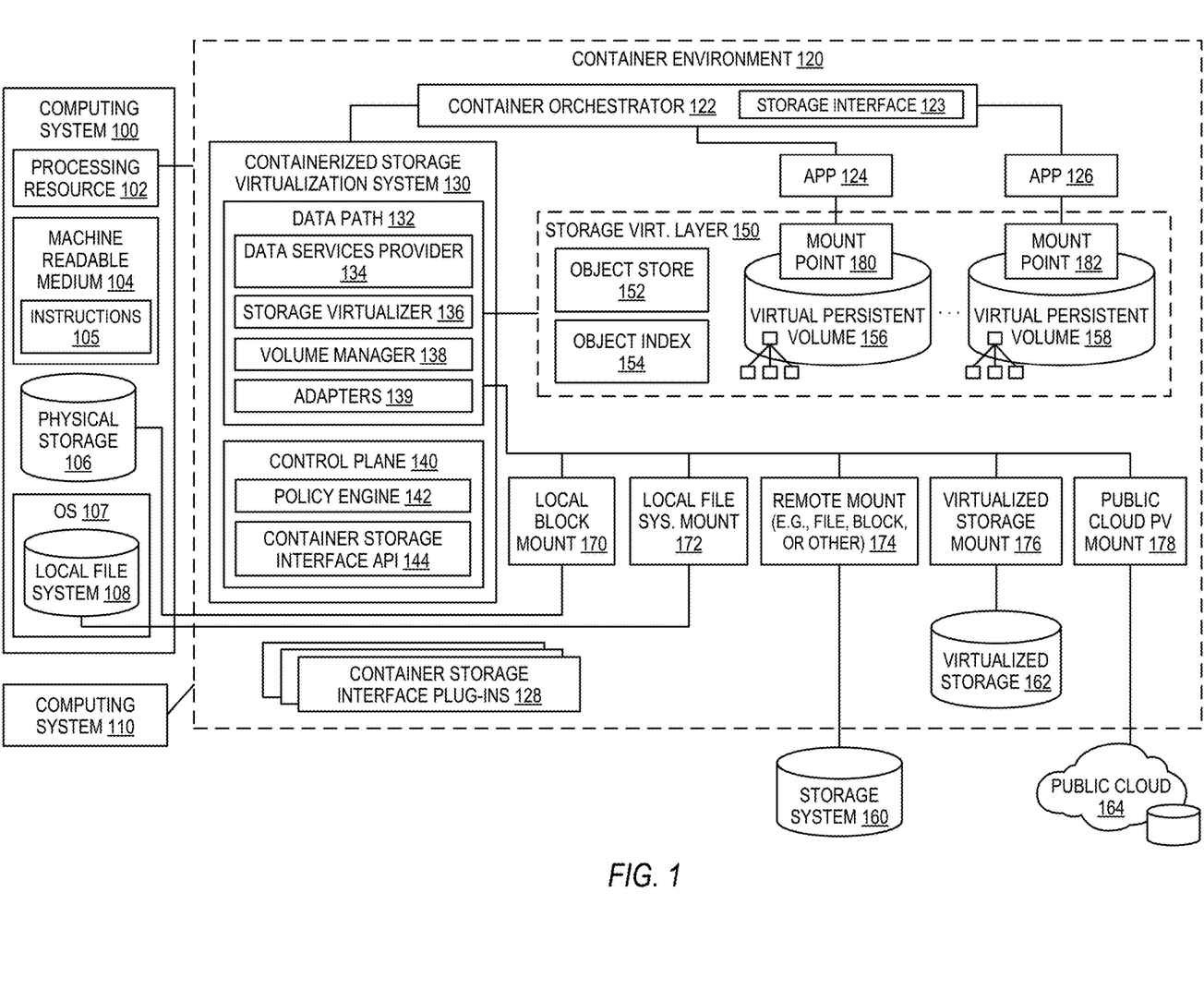
FIG. 1 depicts an example system that creates a virtual persistent volume that aggregates a plurality of different underlying storage and is presented to a containerized application.

Referring now to the figures, FIG. 1 depicts an example computing system 100 that supports and participates in a container environment 120. The computing system 100 includes a processing resource 102 that may include a microcontroller, a microprocessor, central processing unit core(s), an application-specific integrated circuit (ASIC), a field programmable gate array (FPGA), etc. The computing system 100 includes a machine readable medium 104 that may be non-transitory and include random access memory (RAM), read-only memory (ROM), electrically erasable programmable read-only memory (EEPROM), flash memory, a hard disk drive, etc.

The processing resource 102 may execute instructions 105 (i.e., programming or software code) stored on machine readable medium 104 to perform functions of the computing system 100, such as providing a container orchestrator 122 and a containerized storage system 130, as will be described further below. More particularly, each of the components of the containerized storage virtualization system 130 may be implemented as executable instructions 105, including the data services provider 134, storage virtualizer 136, volume manager 138, adapters 139, policy engine 142, and container storage interface API 144. Containerized applications 124, 126 and container storage interface plug-ins 128 also may be implemented as instructions included in executable instructions 105. Additionally or alternatively, the processing resource 102 may include electronic circuitry for performing the functionality described herein.

The computing system 100 may also include other hardware components, such as physical storage 106. Physical storage 106 may include any physical storage device, such as a hard disk drive, a solid state drive, or the like, or a plurality of such storage devices (e.g., an array of disks), and may be locally attached (i.e., installed) in the computing system 100. In some implementations, physical storage 106 may be accessed as a block storage device.

In some cases, the computing system 100 may also include a local file system 108, which may be implemented as a layer on top of the physical storage 106. For example, an operating system 107 may be executing on the computing system 100 (by virtue of the processing resource 102 executing certain instructions 105 related to the operating system) and the operating system 107 may provide a file system 108 to store data on the physical storage 106.

The computing system 100 may be in communication with other computing systems, such as computing system 110, via a wired and/or wireless network for example. The other computing systems may be similar to the computing system 100, and may each include at least a processing resource and a machine readable medium. The computing systems 100 and 110 may each execute software (i.e., processing resource 102 executes certain instructions 105) to deploy nodes of a container orchestrator 122. In other words, the container orchestrator 122 may have a cluster architecture that includes the container orchestrator nodes of computing systems joined in a cluster. The container orchestrator 122 acts as a platform for deploying and managing containerized applications across the cluster of computing systems. The container orchestrator 122, containerized applications deployed therefrom, and other container resources (such as container storage) are deemed to be within a container environment 120. By contrast, other elements may function outside the container environment 120, such as the local file system 108 and an operating system 107 of the computing system 100.

In FIG. 1 for the purposes of illustration, containerized applications 124 and 126 are deployed via the container orchestrator 122 locally on computing system 100. Thus, it may be said that the applications 124, 126 are remote to other nodes, such as computing system 110. The containerized applications 124, 126 may represent microservices, user applications, or the like. The container environment 120 may also host containerized applications (not shown) local to other computing systems in the cluster.

The container orchestrator 122 also deploys a containerized storage virtualization system 130, which will be described in more detail below. In the example of FIG. 1, the containerized storage virtualization system 130 is also executing locally on the computing system 100 and processing resource 102 thereof. In some implementations, other containerized storage virtualization systems of other computing systems in the cluster are also included in the container environment 120, although they are not depicted in FIG. 1. For example, the containerized storage virtualization system 130 may serve as a node in a storage virtualization platform having a cluster architecture, where multiple containerized storage virtualization systems (at least some of which may be executing on different and separate physical computing systems) cooperate to store and manage data in a storage virtualization layer.

The container orchestrator 122 may also include a standardized container storage interface 123. The container storage interface 123 has a plug-in architecture and can provision storage in the form of a persistent volume from a storage source using a corresponding one of a plurality of available container storage interface plug-ins 128. To "provision" storage may refer to the process of allocating a certain amount of storage capacity and making that allocation available to a consumer. Plug-ins 128 may be provided by various vendors and may expose an associated storage system to the container storage interface 123. Non-limiting examples of plug-ins include a block protocol plug-in (e.g., based on Internet Small Computer Systems Interface or iSCSI protocol), a file protocol plug-in (e.g., based on Network File System or NFS protocol, Common Internet File System or CIFS protocol, Server Message Block or SMB protocol), a public cloud persistent volume plug-in, and other plug-ins based on any other storage type (e.g., custom drivers). For convenience, individual ones of the plug-ins 128 may be referred to herein as a plug-in 128 (e.g., a block protocol plug-in 128 or a file protocol plug-in 128). A plug-in 128 may undergo an installation and set up process in the container environment 120 as required for that plug-in (e.g., populating credentials or other configuration details). In some cases, one or more of the plug-ins 128 may be running as a containerized application. However, a persistent volume provisioned through the plug-in 128 may be limited to a single type of storage corresponding to that plug-in. In contrast, the containerized storage virtualization system 130 disclosed herein advantageously may be useful for creating persistent volumes that blend multiple underlying storage types.

The containerized storage virtualization system 130 (also referred to as storage virtualization system 130) runs within one or more containers, and may be implemented in executable instructions 105. As will become evident, the storage virtualization system 130 provides an extra storage virtualization layer between a requesting application and one or more allocations of storage provisioned through the container storage interface 123. The storage virtualization system 130 includes a data path 132 and a control plane 140. The data path 132 includes data services provider 134, storage virtualizer 136, and a volume manager 138. The data path 132 also may include storage adapters 139 for accessing local storage (i.e., storage on the same computing system 100 on which the storage virtualization system 130 is hosted), such as a block adapter for mounting local physical storage 106, stacked file and block adapters for accessing local file system 108 as a block device, or other storage adapters.

The control plane 140 includes a policy engine 142 and a container storage interface API (application programming interface) 144. During an initialization phase of the storage virtualization system 130, the control plane 140 may receive from an administrator or the container orchestrator 122 a list of available container storage interface plug-ins 128 in the container environment 120. The control plane 140 may also acknowledge the storage adapters 139 available to the data path 132 for mounting local storage. The control plane 140 may also maintain a list of characteristics of the storage associated with each of those available plug-ins 128, such as performance characteristics (e.g. latency, IOPS or Input/Output Operations per Second, etc.), security characteristics (e.g., encryption, isolation, etc.), data protection characteristics (e.g., available RAID, or redundant array of independent disks, levels), cost characteristics (e.g., dollar per GB), or other characteristics.

The functionality of the data path functions 132 and control plane functions 140 will now be described in the context of providing storage to containerized applications 124, 126. A containerized application, such as application 124 may request storage from the container orchestrator 122. For example, the application 124 may need a persistent volume to store data. In some implementations, the application 124 may pass one or more requirements with the request, such as a capacity requirement, a performance requirement (e.g., latency, IOPS, etc.), a data protection requirement (e.g., RAID level), a cost requirement (e.g., dollar per GB), a security requirement, a tiering requirement (e.g., specified amounts of hot and cold storage), or other requirement. In some implementations, the container orchestrator 122 may maintain a storage abstraction called an orchestrator persistent volume in response to the request.

The container orchestrator 122 may use the container storage interface 123 to send the request to the storage virtualization system 130 through the container storage interface API 144 of the control plane 140 (with interface 144 acting as a server). In this manner, containerized storage virtualization system 130 may be understood to act as a storage provider to container orchestrator 122. In some implementations, the control plane 140 may assign an identifier to the request, such that each request can be individually identified, particularly with respect to the storage that will be provisioned for each request in the manner described herein.

The policy engine 142 of the container orchestrator 122 analyzes the request to determine what types of storage meet the requirements of the request. For example, the control plane 140 may have one or more of the following types available for storage provisioning: the physical storage 106, the local file system 108, a remote storage system 160, a virtualized storage 162, or public cloud storage 164. Additionally, more than one of any of the types of storage depicted may exist, but are not shown for clarity of illustration. For example, multiple remote storage 160 may be available from which to provision allocations of storage.

Remote storage system 160 as depicted in FIG. 1 may represent either a file system (e.g., a network-attached storage, or NAS, file server), block storage system (e.g., a storage area network, or SAN, storage device), or any other type of storage system that is remote to the computing system 100 and thus remote to the containerized storage virtualization system 130. For example, being remote may mean that the computing system 100 communicates with the remote storage system 160 via a network connection or the like.

Virtualized storage 162 may represent any existing persistent volume in a virtual environment, such as a persistent volume in the container environment 120 including container storage provisioned through the container storage interface 123 independent of the containerized storage virtualization system 130. In some examples, virtualized storage 162 may represent container storage provisioned by another container storage virtualization system other than system 130 (e.g., hosted on a different node than computing system 100). In some examples, virtualized storage 162 may represent storage provided by a virtual machine or hypervisor based software-defined storage platform.

The policy engine 142 may determine a mix of the foregoing storage types. For example, the policy engine 142 may compare the request to the available storage types to identify a closest match. To illustrate, the request may ask for certain amount of high speed storage and a certain amount of low cost, archival class storage. The policy engine may determine that physical storage 106 meets the high speed storage requirement (e.g., due in part to locality and being a high speed media in this example) and a block storage device 160 meets the low cost, archival class requirements.

Subsequently, the control plane 140 utilize the adapters 139 and/or container storage interface plug-ins 128 to provision each storage type in the determined mix and to acquire a mount point for each provisioned storage. A mount point allows access to the provisioned storage by a consumer, such as the data path 132 as will be described below.

As an example of local provisioning, the control plane 140 may use a block adapter from the adapters 139 to provision an allocation from physical storage 106 and acquire a local block mount point 170 (e.g., local host device mount point) to access that allocation. As another example, the control plane 140 may use stacked file and block adapters to provision an allocation from the local file system 108 and to acquire a local file system mount point 172 to access that allocation as a block device (i.e. "file as block device").

To provision storage via the plug-ins 128, the control plane 140 via the container storage interface API 144 communicates with the storage interface 123 to request that a plug-in 128 provision an allocation from its associated storage and provide a mount point back to the control plane 140. As an example, presuming the remote storage system 160 represents a remote block device (e.g., a SAN storage array external to the computing system 100), the control plane 140 may request (via 144 and 123) that a block protocol plug-in 128 (e.g., based on iSCSI protocol) provision an allocation from the block-type remote storage system 160 and provide a remote volume mount point 174 (e.g., iSCSI target and LUN, or Logical Unit Number) to access that allocation. As another example, the remote storage system 160 may represent a remote file device (e.g., a NAS file server), and the control plane 140 may request (via 144 and 123) that a file protocol plug-in 128 (e.g., based on NFS protocol) provision an allocation from the file-type remote storage system 160 and provide a remote volume mount point 174 (e.g., an IP address and export name under NFS) to access that allocation. In some implementations, the control plane 140 may utilize a block protocol plug-in 128 to provision from physical storage 106 or utilize a file protocol plug-in 128 to provision from the local file system 108, instead of using an adapter 139.

As another example of provisioning by way of a plug-in, the control plane 140 may request (via 144 and 123) that a plug-in 128 matching the virtualized storage 162 provision an allocation from the virtualized storage 162 and provide a virtualized storage mount point 176 to access that allocation. As another example, the control plane 140 may request (via 144 and 123) that a public cloud plug-in 128 provision an allocation from the public cloud storage 164. In return, the public cloud plug-in 128 may provide a public cloud persistent volume mount point 178 to access that allocation.

Although FIG. 1 depicts a local block mount point 170, a local file system mount point 172, a remote volume mount point 174, a virtualized storage mount point 176, and a public cloud persistent volume mount point 178, more or fewer mount points and mount points of any combination may be requested by the control plane 140 and acquired via the adapters 139 or plug-ins 128. In various instances, multiple local block mount points 170, multiple local file system mount points 172, multiple remote volume mount points 174, multiple virtualized storage mount points 176, and/or multiple public cloud persistent volume mount points 178 may be requested and acquired by the control plane 140. Moreover, the storage system 160 and the remote mount point 174 may represent respectively one or more of the same or different types of remote storage and a mount point thereof, including block, file, or other types of remotely accessible storage. The particular combination of storage mount points requested and acquired by the control plane 140 may depend on the storage request from the containerized application 124, and more particularly, may depend on the handling of that storage request by the policy engine 142.

Once the one or more storage mount points (e.g., 170, 172, 174, 176, or 178) have been acquired by the control plane 140 in accordance with the policy engine 142, the control plane 140 passes the acquired mount points to the data path 132. The control plane 140 may identify the mount points as being associated with a particular request, by associating the mount points with the request identifier for example. As will be described, the data path 132 consumes and blends the mount points to create a virtual persistent volume 156 presented by a mount point 180 to the requesting containerized application 124. In this manner, the allocated storage corresponding to the acquired mount points (e.g., 170, 172, 174, 176, or 178) may be referred to as the underlying storage of the virtual persistent volume 156. The containerized application 124 thus reads and writes data to the virtual persistent volume 156. Before describing the creation of the virtual persistent volume 156, operational aspects of the data path 132 will first be described.

The data path 132 includes storage virtualizer 136, which maintains an object-based storage virtualization layer 150. A purpose of the storage virtualization layer 150 is to decouple where data is stored (i.e., storage allocations accessed via the mount points 170, 172, 174, 176, and/or 178) from how data is presented to a consumer of the data (e.g., containerized application 124). In this manner, data services such as migration, backup, snapshotting, replication, deduplication, compression, and others, may be performed on any mix of underlying storage and with decreased, minimal, or even no disruption to a consumer of the data.

An aspect of the storage virtualization layer 150 is that the storage virtualizer 136 stores data as "objects" in an object store 152. More particularly, the object store 152 may store different types of objects, including data objects and metadata objects. Data related to the containerized application 124, including files and/or directories, is made up of one or more data objects. Metadata objects may, among other things, be useful for organizing the data objects in a useful and orderly manner, as will be described below. In some implementations, each data object in the object store may be a fixed amount of data, such as 4 or 8 kibibytes of data for example, and metadata objects may also be a fixed amount of data, such as 1 kibibyte.

An object-based storage virtualization layer 150 may be different from block level storage (e.g., implemented in a SAN and presented via a storage protocol such as iSCSI or Fibre Channel) and file level storage (e.g., a file system which manages data in a file hierarchy and is presented via a file level protocol such as NFS or SMB/CIFS), although the object-based storage virtualization layer 150 may underlie block or file level storage protocols (e.g., by abstraction via mount points 180, 182 as will be described).

The storage virtualizer 136 maintains an object index 154, which tracks, for each object (data object and metadata object) in the object store 152, a signature, a physical address, and a reference counter. The signature of an object may be a cryptographic digest of the content of that object, using a hash function such as SHA-1, SHA-256, MD5, etc. Thus, the signature may also be referred to as a content-based signature. The reference counter in the object index 154 refers to the number of times the associated object is referenced across all the virtual persistent volumes (including 156, 158) in the storage virtualization layer 150.

The physical address in the object index 154 refers to the actual physical location of the object. In some examples, while the object store 152 may be understood to be a storage construct for describing the storage of objects within the storage virtualization layer 150, it may also be understood that the objects are stored physically on the underlying storage at the physical address. Because the data path 132 can consume multiple storage mount points, the particular mount point may be a part of the physical address. Additionally, the physical address may include a location within the storage allocation of a given mount point. For example, if the mount point pertains to physical storage 106, the physical address may include a logical block number. If the mount point pertains to public cloud storage 164, the physical address may include a reference to a cloud object in the syntax of the corresponding hosting provider. The volume manager 138 is configured to perform data reads and writes to specified physical addresses, such as the physical addresses stored in the object index 154.

In some implementations, the containerized storage virtualization system 130 may utilize an additional layer of indirection between the object index 154 and the actual physical location of objects. In such implementations, the volume manager 138 may assign and/or divide the underlying storage allocations at each mount point provided by the control plane 140 into extents (or also referred to as mini-volumes). The additional layer of indirection may be implemented by storing a virtual address instead of a physical address in the object index 154 in association with an object signature and maintaining an extent table that maps a given virtual address to an extent and thus the corresponding underlying storage. Thus, to access an object based on a virtual address, the volume manager 138 can first identify the extent targeted by the virtual address using the extent table and a first portion of the virtual address, and then locate the object within the extent using a second portion of the virtual address. In this manner, certain data services such as migration and tiering between extents may be performed in an efficient manner by updating just extent identifiers in the extent table, rather than updating a large amount of in-memory or persisted references to the data objects (i.e., each affected address in the object index 154) and regenerating various logical addresses, indexes, and other data structures utilized in managing the storage system.

Within the storage virtualization layer 150, the storage virtualizer 136 maintains one or more virtual persistent volumes (also referred to herein as virtual PVs) backed by the object store 152. In some implementations, a containerized application will be associated with a virtual PV in a one-to-one relationship. For example, in the example illustration of FIG. 1, containerized application 124 is associated with virtual PV 156, and containerized application 126 is associated with virtual PV 158. In some implementations, each virtual PV is mapped by the container orchestrator 122 to a corresponding orchestrator persistent volume maintained by the container orchestrator 122, and the requesting containerized application 124 accesses the storage of the virtual PV 156 is accessed by via the orchestrator persistent volume.

In other cases, containerized applications and virtual PVs may be associated in one-to-many, many-to-one, or many-to-many relationships. For the sake of illustration only, virtual PVs will now be described with reference to virtual PV 156, although it should be understood that like description may apply to other virtual PVs such as virtual PV 158 and other virtual PVs not shown.

In an implementation, virtual persistent volume 156 may be an organization of metadata objects and data objects stored in the object store 152, where the organization hierarchically relates the data objects by associated content-based signatures up to a root object. In an example, the virtual PV 156 may be a Merkle tree (also referred to as a hash tree) or any other hierarchical arrangement (e.g., directed acyclic graphs, etc.). In the case of a hierarchical Merkle tree, data objects may be located at the lowest tree level of any branch (also referred to as the leaf level, which is most distant from the root object) and such data objects may be referred to as leaf data objects. As described above, data objects make up the data of the containerized application 124, such as files and directories.

Within the hierarchical arrangement, a parent object refers to an object that includes as its content the signatures of child objects. For example, a parent object of leaf level data objects is a metadata object that stores as its content the signatures of its child leaf level data objects. In this manner, the signatures of objects at each level are collected in parent objects at a next level higher in the hierarchical arrangement until the root object is reached. Thus, the root object also is a metadata object that stores as content the signatures of respective child objects. From another perspective, the hierarchical arrangement expands in a direction from the root object to the leaf level—a metadata object at any given level may expand to a number of child nodes dictated by a predefined branching factor. A metadata object may be able to store a quantity of signatures that is at least equal to a branching factor of the hierarchical arrangement, so that it may hold the signatures of all child objects.

Any change in the data of the virtual PV (i.e., new data, modified data, deleted data) translates to a change in the content of one or more leaf level data objects, which will precipitate a change in the content-based signatures of those changed data objects, which will cause content and signature changes to propagate through parent nodes upward to the root object. Thus, a virtual PV 156 at a given point in time (also referred to as a snapshot in time) may be identified uniquely by its root object, and more particularly, identified by its root object signature.

Another aspect of virtual PV 156 is that, in some implementations, a given file or directory from among the containerized application 124 may be stored in a corresponding subtree arrangement within the virtual PV 156. In other words, the virtual PV 156 may be delineated into subtrees, each of which correspond to a respective file or directory of the containerized application 124.

Because files and directories are made up of one or more data objects and those data objects are arranged in the virtual PV 156 and subtrees thereof by reference to associated data object signatures, in some implementations each of the data objects may be physically stored just once in the object store 152 and referred to by their respective signatures in multiple metadata objects in the virtual PV 156 or in any other virtual PV (e.g., 158) in the storage virtualization layer 150. Thus, data may be deduplicated in this manner by the storage virtualizer 136. Similarly, metadata objects can be stored once and referred to multiple times by corresponding signatures. The number of times a data object or metadata object is referenced in the storage virtualization layer 150 may be recorded in the corresponding reference counters of the object index 154. In some implementations, deduplication of data may be performed inline during a write operation, in contrast to post-processed or near-line deduplication, and in this manner, storage of data may be described as natively deduplicated in the storage virtualization layer 150 and among the virtual PVs 156, 158.

In use cases where security is a consideration, including multi-tenancy scenarios, separate object stores may be utilized for each sensitive security domain. Thus, sensitive data may be isolated to a secured object store without participating in the deduplication of other virtual PVs not within the security domain.

In order for the containerized application 124 to access the virtual PV 156, the data path 132 may provide a mount point 180. The data path 132 can provide any type of mount point from a plurality of types of mount points, including without limitation, a block type mount point (e.g., iSCSI compatible), a file type mount point (e.g., a Filesystem in Userspace or FUSE interface, or NFS, SMB, or CIFS compatible), a key/value share mount point (e.g., a noSQL volume or an Amazon S3 compatible API), and other types of mount points. In this manner, the mount point may be understood to contribute to complete storage access abstraction, because the containerized application 124 is provided with whatever type of storage access is required by the containerized application 124 (e.g., file protocol or block protocol, etc.) regardless of the underlying type of storage that makes up the virtual PV 156 (e.g., regardless of software-based or hardware-based, block or file, local or remote, etc.).

The type of mount point, that is, the type of abstraction, may be user selected or may be predefined according to the containerized application 124 requesting the storage (i.e., based on a class of containerized application, dictated by the container orchestrator 122, etc.). The type of abstraction may be indicated to the containerized storage virtualization system 130 via the storage request received at the control plane 140.

In the example of FIG. 1, the containerized storage virtualization system 130 also may provide a mount point 182 to containerized application 126 to access a virtual persistent volume 158 created in response to a request for storage from the containerized application 126 to the container orchestrator 122, in a manner similar to that described above for the mount point 180 of virtual PV 156 for containerized application 124. The virtual PVs 156 and 158 may both include respective Merkle trees for organizing respective sets of data, while the object store 152 stores the data of both virtual PVs 156 and 158 in a deduplicated manner.

In operation (i.e., after the virtual PV 156 is created and mount point 180 provided to application 124), the storage virtualization system 130 may service input/output (I/O) requests from the containerized application 124 directed to a virtual PV 156 via the mount point 180. For example, to serve a read request received through the mount point 180, the storage virtualizer 136 may identify the signatures of data objects in the virtual PV addressed by the read request (i.e., which may include walking the Merkle tree structure of the virtual PV based on an address of the read request) and determine the physical addresses of those data object signatures from the object index 154. In some implementations, the physical address of a data object may specify the mount point of the underlying storage allocation where the data object is stored (e.g., one or more of mount points 170, 172, 174, 176, or 178). The storage virtualization system via the volume manager 138 may then read the data objects using the physical addresses (or using a virtual address and extent map as described above) and return the read data to the containerized application 124 through the mount point 180.

To serve a write request, the storage virtualizer 136 may, in example implementations, receive the data to be written to the virtual PV 156 from the containerized application 124, check whether the data includes any data objects that are new to the object store 152 based on content-based signatures, and write to the object store the new data objects (i.e., data objects that do not already exist in the data store). In some implementations, the storage virtualizer 136 may compress the new data objects before writing to the object store 152. The process of writing to the object store 152 in particular may involve controlling to which underlying storage allocation (e.g., 106, 108, 160, 162, or 164) the new data objects are written. In some implementations, the containerized application may indicate in the write request to which underlying storage allocation to write the data. In some implementations, new data may be written by default to a local storage portion of the virtual PV 156, such as locally attached physical storage 106, which may provide "hot" tier storage optimized for frequent access. In some implementations, the containerized application may indicate a particular policy or service level agreement for writing the data and the storage virtualization system may determine which underlying storage allocation meets that policy or SLA. The storage virtualization system then utilizes the mount point (e.g., 170, 172, 174, 176, or 178) corresponding to that underlying storage allocation to write the data objects. The storage virtualization system also adds the signature of data objects to metadata objects of the virtual PV 156.

Representing data in a virtual PV 156 that is natively deduplicated and uniquely identified by a root object signature may enable efficient data services, including those provided by data services provider 134. For example, data services provider 134 may perform, without limitation, snapshot-based back up, replication, migration, tiering, redundancy-based data protection (e.g., redundant array of independent nodes, also referred to as RAIN; or RAID), or other capabilities. The data services provider 134 may perform the data services with the virtual PV 156 in a manner that is transparent or non-disruptive to the containerized application 124. For example, the data services can be performed without modifying the mount point 180 and in the case of some data services, without input or instruction (e.g., configuration details, set up commands, etc.) from a user, the containerized application 124, or the container orchestrator 122. Moreover, in some examples, the data services provider 134 may manipulate data primarily at the storage virtualization layer 150, such that the data services are performed in a manner that is irrespective of the different underlying storage mounts and the particular composition of the virtual PV 156. In other words, the data services provider 134 can consistently perform a common set of data services regardless of what type of underlying storage makes up the virtual PV 156 in a non-disruptive manner. The foregoing technical benefits may be made possible by virtue of, for example, the virtual PV 156 decoupling the underlying storage from the containerized application 124.

For example, data services provider 134 may perform an efficient snapshot-based backup data service. In some implementations, the difference between snapshots in time of a hierarchically arranged virtual PV 156 can be efficiently accomplished by comparing object signatures in a top-down iterative manner starting at the root object to find metadata and data objects that differ. For example, in an operation to back up a current state of the virtual PV 156 (i.e., a current snapshot), the current snapshot may be on a primary system (e.g., computing system 100) and an older, previously backed up, snapshot may already exist on a backup system (e.g., computing system 110). In that example, the difference between the current snapshot and the older snapshot may be determined by comparing signatures of the snapshots in the previously described manner, and the backup system may be searched to determine if the metadata or data objects that differ already exist on the backup system (i.e., in an object store of the backup system). Only those metadata or data object that do not exist are copied from the primary system to the backup system, thus reducing the amount of data traffic and improving backup times. In other implementations, snapshot-based backups may be made on the same primary system instead of or in addition to the backup system in a similar manner.

The snapshot-based backup may be performed on a scheduled basis for example, without disrupting the containerized application 124. Moreover, the snapshot-based back up may be performed primarily at the software virtualization layer 150, thus avoiding complexities of managing each individual underlying storage directly. Similar to the backup process, a restoration process may also proceed with a comparison of the metadata or data objects to be restored and the objects already existing on the restoration target, and a transmission of only that data that does not exist on the restoration target.

The data services provider 134 may also perform a migration operation. The migration may move data objects between different ones of the underlying storage within a virtual PV 156, including between different local storage, between local and remote storage, between different remote storage, between different public cloud storage, between public cloud storage and non-public cloud storage (either local or remote), or between other combinations of underlying storage. The migration is handled at the storage virtualization layer 150 by associating the new physical address of a moved data object to the unchanged content-based signature in the object index 154, thus making the migration transparent to the containerized application 124.

As another example, the data services provider 134 may migrate the virtual PV 156 to a different computing system. For example, in some cases, it may be useful to migrate a virtual PV 156 to be close to a workload using the virtual PV 156. In an example scenario, the container orchestrator 122 may move the containerized application 124 to a different computing system (e.g., from source computing system 100 to destination computing system 110) for the sake of load balancing or another reason, and the virtual PV 156 may need to be migrated to be close to the containerized application 124. In some implementations, the storage virtualization system 130 may migrate management of the virtual PV 156 to another storage virtualization system on the destination computing system 110 to which the containerized application 124 was migrated. The data services provider 134 may also migrate some of the data in the virtual PV 156, such as migrating data objects that were local to the computing system 100 (e.g., on underlying physical storage 106) to the physical storage of the different computing system 110, which may be useful for maintaining storage locality and other performance characteristics of the virtual PV 156. Such migration may involve identifying whether the destination computing system 110 already has a copy of metadata or data objects to be migrated, and transmitting only data objects that do not exist on the destination computing system 110. At the same time, the same mount point 180 may be maintained and undisrupted for the containerized application 124.

The data services provider 134 may also perform data tiering within a virtual PV 156, that is, moving data between different types of underlying storage that may offer different characteristics and comply with different storage policies. For example, tiering may be implemented by virtue of assigning and/or dividing the constituent storage allocations of the virtual PV 156 to different extents, as previously described. Under certain triggering conditions, the data services provider 134 (in conjunction with the volume manager 138 in some implementations) may move data objects from one extent to a different extent, and update the extent table accordingly. Example triggering conditions may include an increased security status of data which may cause the data services provider 134 to move that data from public cloud storage 164 to non-cloud storage 106, 108, 160, or 162; aging of data which may cause the data services provider 134 to move that data to an archival class of storage (e.g., remote storage 160); recent frequent access of data which may cause the data services provider 134 to move that data to high performance storage (e.g., local physical storage 106); or other types of conditions. By virtue of moving and managing data at the storage virtualization layer 150, data tiering may be performed across any type of underlying storage and without disrupting the mount point 180 or containerized application 124.

The data services provider 134 may also support redundancy based data protection. For example, the data services provider 134 may provide RAID data protection. For example, the data services provider 134 (in conjunction with the volume manager 138 in some implementations) may create a RAID set across underlying storage allocations or within an underlying storage allocation (e.g., in cases where local physical storage 106 includes a set of drives). The data services provider 134 may feature a software RAID controller or cooperate with a hardware RAID controller to write objects of the virtual PV 156 to the RAID set according to a RAID scheme such as RAID 1, RAID5, or RAID 6.

The data services provider 134 also may provide RAIN data protection by replicating or mirroring data of a virtual PV 156 (also referred to as a primary virtual PV for ease of discussion) for data protection and high availability purposes in keeping with RAIN architecture principles. In some implementations, the data services provider 134 may replicate or mirror data at inception when the data comes in to the storage virtualization layer 150 as a write request from the containerized application 124. In some implementations, the replicated data may form a virtual PV replica, which may have a form similar to a virtual PV (e.g., including a Merkle tree) and may be managed by and local to a different storage virtualization system on a different computing system 110, relative to the primary virtual PV that is local to computing system 100. Additionally or alternatively, the virtual PV replica may be made up of underlying storage that is different and/or separate from the underlying storage that makes up primary virtual PV 156. Thus, if data on the primary virtual PV is unrecoverable, the data may be restored from the virtual PV replica using a failover procedure.

To summarize, by virtue of a containerized storage virtualization system 130 aggregating various types of storage into a virtual persistent volume that can be presented as any number of available storage abstractions, the container storage data path can be highly virtualized from end to end. Thus, users of containerized applications may be afforded a high degree of flexibility in requesting any composition of underlying storage to suit performance needs (or other needs) of an application while also being able to consume the storage using any type of abstraction suitable for the application. Moreover, a consistent set of storage services may be provide regardless of the composition of underlying storage and regardless of the type of storage access abstraction used to present the virtual PV.

Figure 2:
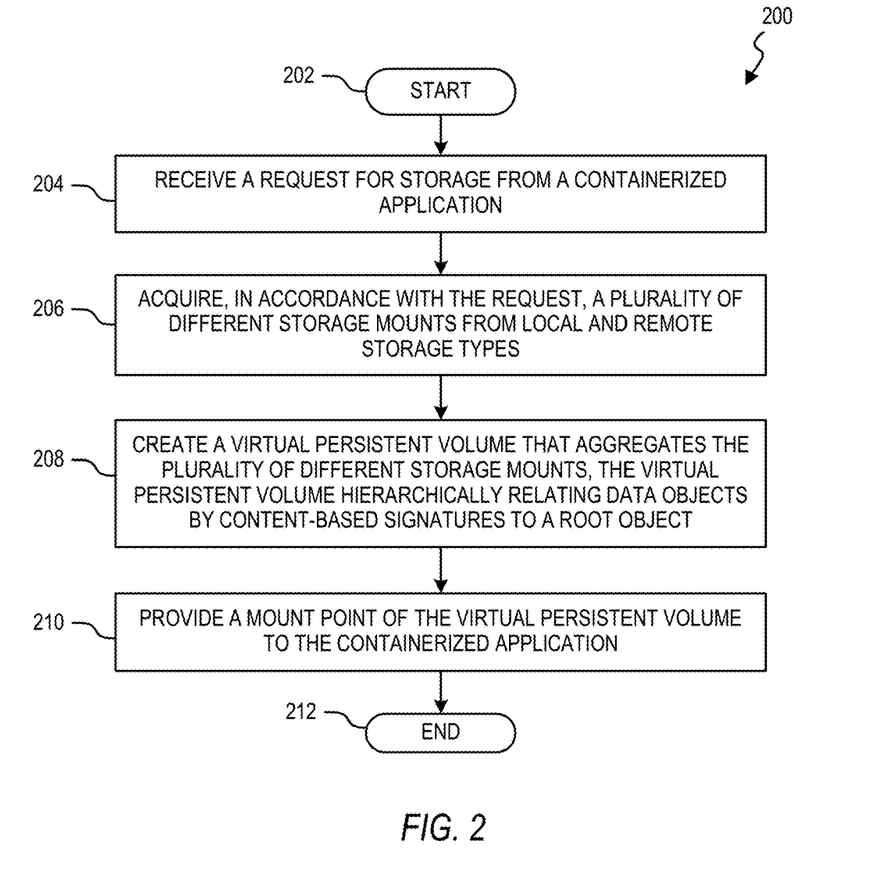
FIG. 2. depicts an example method that includes creating a virtual persistent volume.
Figure 3:
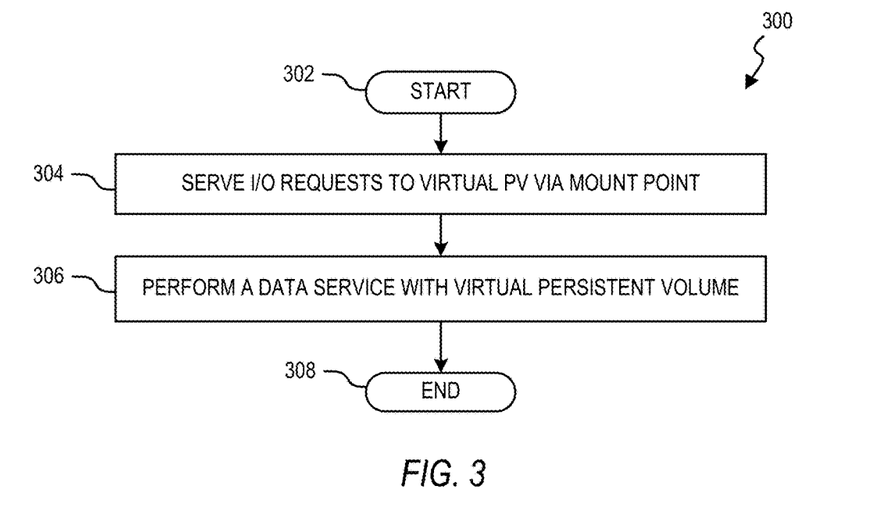
FIG. 3. depicts an example method that includes performing a data service with a virtual persistent volume.

FIGS. 2 and 3 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 2 and 3 may be implemented in the form of executable instructions stored on a machine readable medium (e.g., such as instructions 105 stored on the machine readable medium 104) and executed by a processing resource (e.g., such as the processing resource 102) and/or in the form of electronic circuitry. For example, aspects of the methods may be described below as being performed by a storage virtualization system on a computing system, an example of which may be the containerized storage virtualization system 130 on the computing system 100 described above. In other words, in some implementations, at least parts of the storage virtualization system described in connection with the methods 200 and 300 may be implemented in a container executing on a hardware-based processing resource. Additionally, other aspects of the methods described below may be described with reference to other elements shown in FIG. 1 for illustration purposes.

FIG. 2 is a flow diagram depicting an example method 200. Method 200 may be useful for providing a containerized application with storage in the form of a virtual persistent volume that virtualizes other types of persistent storage. Method 200 starts at block 202 and continues to block 204, where a storage virtualization system (e.g., 130) receives a request for storage from a containerized application (e.g., 124). In some implementations, the request may be received by a control plane aspect (e.g., 140) of the storage virtualization system. Moreover, in some implementations, the request may be submitted by the containerized application to a container orchestrator (e.g., 122), which in turn communicates the request to the storage virtualization system via a container storage interface (e.g., 123).

At block 206, the storage virtualization system (or more particularly, the control plane thereof) acquires a plurality of different storage mounts from various types of available storage, in accordance with the request. The various types of storage may be characterized as being local or remote storage, hardware/physical storage or software-defined storage, file-based storage, block-based storage, object-based storage, cloud storage, any other types of storage, or a combination of the foregoing types.

For example, local storage types may include storage that is local to the storage virtualization system (in other words, located in a same computing system as the processing resource on which the storage virtualization system is executing), such as a locally attached physical storage (e.g., 106) that may appear as a block storage device, a local file system (e.g., 108), or a local virtualized storage volume (e.g., 162). Remote storage may include, for example, a storage system that is external to the storage virtualization system and reached by the storage virtualization system over a communication medium, such as Ethernet, Fibre Channel, etc. Remote storage may include a remote file system (e.g., 160), a remote block storage system (e.g., 160), cloud storage (e.g., 164) such as public cloud storage, or a remote virtualized storage volume. Hardware or physical storage may refer to locally attached storage, for example (e.g., 106). Software-defined storage may refer to storage that, for example, is not tied to a specific hardware implementation, can be deployed as software into multiple infrastructure types including virtualized infrastructure, or the like. Thus, in summary, the storage virtualization system is not limited to a single type of storage when fulfilling the request.

To acquire the storage mounts at block 206, the storage virtualization system may utilize a standardized container storage interface (e.g., 144 and 123 in tandem with a plug-in 128) to provision at least some of the storage associated with the plurality of different storage mounts from the local and remote storage types. For example, the storage virtualization system may utilize the standardized container storage interface with a plug-in to provision an allocation of storage from a particular storage system and receive the resultant mount point from that storage system. For some storage types, such as locally attached physical storage, the storage virtualization system may utilize an adapter (e.g., 139) to directly provision an allocation of storage and a resultant storage mount point, without utilizing the container storage interface. In some implementations, the control plane of the storage virtualization system may pass the acquired mount points to a data path portion (e.g., 132) of the storage virtualization system.

At block 208, the storage virtualization system (or more particularly, the data path thereof) creates a virtual persistent volume (e.g., 156) that aggregates the plurality of different storage mounts acquired at block 206. The virtual persistent volume includes a hierarchical structure that relates data objects of the containerized application by content-based signatures to a root object. The hierarchical structure of the virtual persistent volume may take the form of a Merkle tree (also referred to as a hash tree). The data objects may be stored virtually in a common deduplicated object store (e.g., 152) that also services other virtual PVs created by the storage virtualization system. The object store may link the data objects to an actual storage location on the underlying storage, via an object index.

At block 210, the storage virtualization system provides a mount point of the virtual persistent volume to the containerized application that requested the storage (e.g., via request received at block 204). The storage virtualization system may be capable of providing any one of a plurality of mount points related to various types of storage access abstractions. For example, the storage virtualization system may present the virtual PV as a file system type of storage abstraction and export a file system mount point accordingly. As another example, the storage virtualization system may present the virtual PV as a block storage system and export a block device mount point accordingly. As another example, the storage virtualization system may present the virtual PV as a key/value pair store and export a key/value pair store mount point accordingly. Method 200 may end at block 212.

FIG. 3 is a flow diagram depicting an example method 300, which may be useful for performing various lifecycle actions for a virtual persistent volume established by method 200. For example, in some implementations, method 300 may be performed after method 200. Method 300 starts at block 302 and continues to block 304, where the storage virtualization system serves input/output (I/O) requests directed to a virtual PV via a mount point (e.g., a virtual PV created at block 208 and a mount point provided via block 210 above). For example, the containerized application (e.g. 124) may read data from the virtual PV (e.g., 156) or write data to the virtual PV (e.g., 156) using the mount point (e.g., 180), in the manner previously described with respect to FIG. 1.

At block 306, the storage virtualization system may perform a data service. The data services may be performed with the virtual PV, irrespective of the different underlying storage mounts. In other words, the data services may be performed on virtual PVs consistently regardless of what type of underlying storage constitute a virtual PV. Moreover, the data services may be performed without modifying the mount point of the virtual PV, such that the data services may be provided transparently or non-disruptively with respect to the containerized application. Example data services include migration, tiering, snapshot-based backups, replication, and redundancy-based data protection (e.g. RAIN and/or RAID). Such data services may be performed as previously described with respect to FIG. 1. Method 300 may end at block 308.

Figure 4:
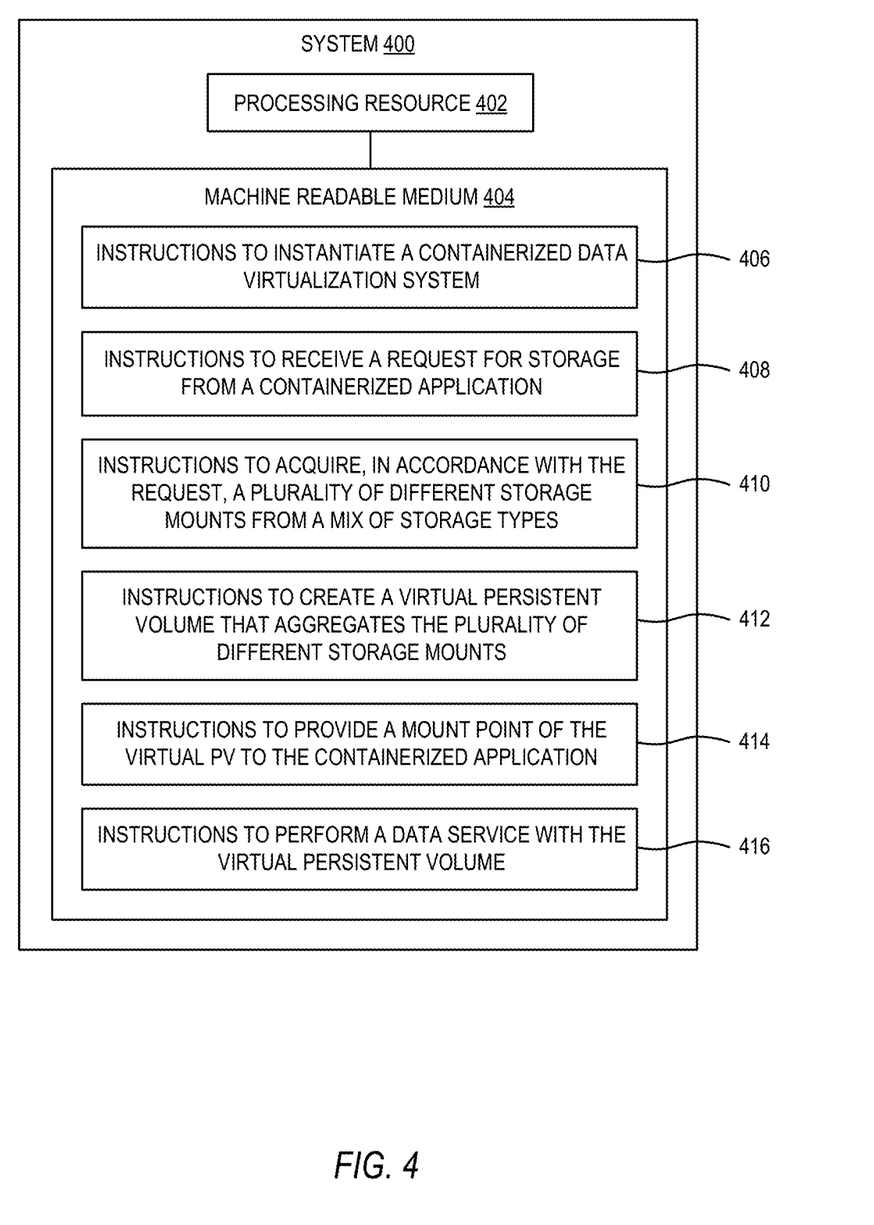
FIG. 4. depicts an example system with a machine readable medium that includes instructions to create a virtual persistent volume.

FIG. 4 depicts an example system 400 that includes a non-transitory, machine readable medium 404 encoded with example instructions 406, 408, 410, 412, 414, 416 (collectively referred to as instructions 406-416) executable by a processing resource 402. In some implementations, the system 400 be useful for implementing the containerized storage virtualization system 130 of FIG. 1, for performing method 200 of FIG. 2, and performing method 300 of FIG. 3. For example, instructions 406-416 may be included in instructions 105 of FIG. 1. In some implementations, functionality described with respect to FIGS. 1-3 may be included in instructions 406-416.

The processing resource 402 may include a microcontroller, a microprocessor, central processing unit core(s), an ASIC, an FPGA, and/or other hardware device suitable for retrieval and/or execution of instructions from the machine readable medium 404 to perform functions related to various examples. Additionally or alternatively, the processing resource 402 may include or be coupled to electronic circuitry or dedicated logic for performing some or all of the functionality of the instructions described herein.

The machine readable medium 404 may be any medium suitable for storing executable instructions, such as RAM, ROM, EEPROM, flash memory, a hard disk drive, an optical disc, or the like. In some example implementations, the machine readable medium 404 may be a tangible, non-transitory medium. The machine readable medium 404 may be disposed within the system 400, in which case the executable instructions may be deemed installed or embedded on the system 400. Alternatively, the machine readable medium 404 may be a portable (e.g., external) storage medium, and may be part of an installation package.

As described further herein below, the machine readable medium 404 may be encoded with a set of executable instructions 406-416. It should be understood that part or all of the executable instructions and/or electronic circuits included within one box may, in alternate implementations, be included in a different box shown in the figures or in a different box not shown. Some implementations of the system 400 may include more or fewer instructions than are shown in FIG. 4.

Instructions 406, when executed, cause the processing resource 402 to instantiate a containerized storage virtualization system that manages data in hierarchical structures, such as hash trees. In particular, the containerized storage virtualization system maintains a deduplicated object store that stores the data objects and metadata objects referenced by virtual persistent volumes created by instructions 412 described below. In some implementations, instructions 406 may coordinate with a container orchestrator to deploy the storage virtualization system as a containerized application. For example, the containerized storage virtualization system 130 of FIG. 1 may be an example of the containerized storage virtualization system instantiated by instructions 406. In some implementations, one or more of instructions 408, 410, 412, 414, 416 to be described may form part of the functionality of the storage virtualization system itself.

Instructions 408, when executed, cause the processing resource 402 to receive a request for storage from a containerized application. Instructions 410, when executed, cause the processing resource 402 to acquire a plurality of different storage mounts from a mix of storage types in accordance with the request received via instructions 408. For example, the mix of storage types may include different ones (i.e., different storage devices) of local storage types, different ones (i.e., different storage devices) of remote storage types, or a combination of at least one of the local storage types and at least one of the remote storage types. In particular, examples of local storage types include storage that is local to the system 400 (e.g., installed in or on the system 400) such as locally attached physical storage, a local file system, or local virtualized storage. Examples of remote storage types include a remote file system, a remote block storage system, cloud storage, or remote virtualized storage.

In some implementations, instructions 408 may cause the processing resource 402 to utilize a standardized container storage interface to provision at least some of the mix of storage types and to receive at least some of the plurality of different storage mounts. The standardized container storage interface may operate in conjunction with a container orchestrator and plug-ins to provision allocations from the storage types. Instructions 408 may also cause the processing resource 402 to utilize adapters (i.e., a block adapter or a file adapter) to provision storage, particularly local storage types.

Instructions 412, when executed, cause the processing resource 402 to create a virtual persistent volume that is managed by the containerized storage virtualization system and that aggregates the plurality of different storage mounts. In an implementation, the virtual persistent volume includes a hash tree (e.g., a Merkle tree) that relates leaf level data objects by content-based signatures up to a root object. The data objects may be data from the containerized application 124, such as files or directories.

Instructions 414, when executed, cause the processing resource 402 to provide a mount point of the virtual persistent volume to the containerized application. Instructions 414 may include multiple types of storage access abstractions and corresponding mount points to select from. For example, instructions 414 can provide a file system mount point to present the virtual PV as a file system, can provide a block device mount point to present the virtual PV as a block storage device, and can provide a key/value store mount point to present the virtual PV as a key/value pair store.

Instructions 416, when executed, cause the processing resource 402 to perform a data service with the virtual persistent volume. In some implementations, instructions 416 may be executed at any time after the virtual PV has been created by instructions 412. Because the data service may be performed primarily with the virtual persistent volume and at a storage virtualization layer, the data service may be provided regardless of the type of underlying storage that the data of the virtual persistent volume is physically stored. The data service may be provided without regard for how the virtual PV is presented (i.e., storage access abstraction of the virtual PV). Moreover, the mount point of the virtual persistent volume need not be modified, and access to the virtual PV by the containerized application need not be disrupted. The data service may include migration, tiering, snapshot-based back up, replication, or redundancy-based data protection (e.g., RAID or RAIN), and instructions 416 may perform these data services in a manner similar to that described above with respect to FIG. 1.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A non-transitory machine readable medium storing instructions executable by a processing resource, the non-transitory machine readable medium comprising:
   instructions to instantiate a containerized storage virtualization system that manages data in hash trees;
   instructions to receive a request for storage from a containerized application;
   instructions to determine a mix of storage types from among available storage types available to a control plane of the containerized storage virtualization system that match requirements associated with the request;
   instructions to acquire a plurality of different storage mounts according to the determined mix of storage types;
   instructions to, in response to a receipt of the request for storage from the containerized application, create a virtual persistent volume that is managed by the containerized storage virtualization system and that aggregates the plurality of different storage mounts, wherein the virtual persistent volume includes a hash tree that relates data objects of the containerized application by content-based signatures to a root object; and
   instructions to provide, via the containerized storage virtualization system, a mount point of the virtual persistent volume to the containerized application.

2. The non-transitory machine readable medium of claim 1, wherein the mix of storage types includes different ones of local storage types, different ones of remote storage types, or a combination of at least one of the local storage types and at least one of the remote storage types.

3. The non-transitory machine readable medium of claim 2, wherein
   the local storage types include locally attached physical storage, a local file system, or local virtualized storage; and
   the remote storage types include a remote file system, a remote block storage system, cloud storage, or remote virtualized storage.

4. The non-transitory machine readable medium of claim 1, wherein the instructions to acquire include instructions to utilize a standardized container storage interface to provision at least some of the mix of storage types and to receive at least some of the plurality of different storage mounts.

5. The non-transitory machine readable medium of claim 1, wherein the containerized storage virtualization system maintains a natively deduplicated object store that stores the data objects of the virtual persistent volume and data objects of other virtual persistent volumes.

6. The non-transitory machine readable medium of claim 5, wherein the containerized storage virtualization system assigns at least one storage allocation accessed via the different mount points to one or more extents that provide indirection for physical addresses of the at least one storage allocation, and
   wherein the non-transitory machine readable medium further comprises instructions to perform a data service on the one or more extents, the data service including tiering or migration.

7. The non-transitory machine readable medium of claim 1, further comprising instructions to perform a data service with the virtual persistent volume irrespective of the different storage mounts and without modifying the mount point.

8. The non-transitory machine readable medium of claim 7, wherein the data service includes migration, tiering, snapshot-based backups, replication, and redundancy-based data protection.

9. The non-transitory machine readable medium of claim 1, wherein the mount point of the virtual persistent volume is selected from among storage access abstractions available to the instructions to provide including a file system mount point, a block device mount point, and a key/value store mount point.

10. A method comprising:
receiving, by a storage virtualization system, a request for storage from a containerized application;
determining, by the storage virtualization system, a mix of storage types from among available storage types available to a control plane of the storage virtualization system that match requirements associated with the request;
acquiring, by the storage virtualization system, a plurality of different storage mounts from local and remote storage types in accordance with the determined mix of storage types;
in response to a receipt of the request for storage from the containerized application, creating, by the storage virtualization system, a virtual persistent volume that aggregates the plurality of different storage mounts, wherein the virtual persistent volume includes a hierarchical structure that relates data objects of the containerized application by content-based signatures to a root object; and
providing, by the storage virtualization system, a mount point of the virtual persistent volume to the containerized application.

11. The method of claim 10, wherein the local and remote storage types include:
a locally attached physical storage or a local file system; and
a remote file system, a remote block storage system, or cloud storage.

12. The method of claim 10, wherein the acquiring includes utilizing a standardized container storage interface to provision at least some of the storage associated with the plurality of different storage mounts from the local and remote storage types.

13. The method of claim 10, wherein at least parts of the storage virtualization system are implemented in a container executing on a hardware-based processing resource.

14. The method of claim 10, wherein the data objects of the virtual persistent volume and data objects of other virtual persistent volumes are stored in a common natively deduplicated object store, and the hierarchical structure is a hash tree.

15. The method of claim 10, further comprising performing a data service with the virtual persistent volume irrespective of the different storage mounts and without modifying the mount point.

16. The method of claim 10, wherein the mount point of the virtual persistent volume is selected from among storage access abstractions available to the storage virtualization system including a file system mount point, a block device mount point, and a key/value store mount point.

17. A system comprising:
a processing resource; and
a non-transitory machine readable medium storing instructions that, when executed, cause the processing resource to:
instantiate a containerized storage virtualization system, executing on the processing resource, that manages data in hash trees,
receive a request for storage from a containerized application,
determine a mix of storage types from among available storage types available to a control plane of the containerized storage virtualization system that match requirements associated with the request,
acquire a plurality of different storage mounts from a mix of storage types according to the determined mix of storage types,
in response to a receipt of the request for storage from the containerized application, create a virtual persistent volume that is managed by the containerized storage virtualization system and that aggregates the plurality of different storage mounts, wherein the virtual persistent volume includes a hash tree that relates data objects of the containerized application by content-based signatures to a root object, and
provide, via the containerized storage virtualization system, a mount point of the virtual persistent volume to the containerized application.

18. The system of claim 17, further comprising a physical storage device,
wherein the mix of storage types includes:
the physical storage device or a local file system on the physical storage device; and
a remote file system, a remote block storage system, cloud storage, or remote virtualized storage.

19. The system of claim 17, wherein the instructions that cause the processing resource to acquire include instructions that cause the processing resource to utilize a standardized container storage interface to provision at least some of the mix of storage types and to receive at least some of the plurality of different storage mounts.

20. The system of claim 17, wherein the non-transitory machine readable medium stores instructions that, when executed, cause the processing resource to perform a data service with the virtual persistent volume irrespective of the different storage mounts and without modifying the mount point.

21. The system of claim 17, wherein the mount point of the virtual persistent volume is selected from among storage access abstractions available to the instructions to provide including a file system mount point, a block device mount point, and a key/value store mount point.

* * * * *